United States Patent

[11] 3,624,494

| [72] | Inventor | Orhan Turan |
| | | 102 Eashin Drive, Fayetteville, N.Y. 13066 |
| [21] | Appl. No. | 787,821 |
| [22] | Filed | Dec. 30, 1968 |
| [45] | Patented | Nov. 30, 1971 |

[54] APPARATUS FOR MONITORING THE RESPONSE OF A RESONANT CIRCUIT
17 Claims, 9 Drawing Figs.

[52] U.S. Cl. .................................................... 324/57 R,
307/237, 328/31, 328/169
[51] Int. Cl. ............................................................ G01n 27/00
[50] Field of Search .................................................. 324/57 Q,
75 SS, 57 D, 81, 34; 328/169, 31, 171, 115;
307/237, 235

[56] References Cited
UNITED STATES PATENTS
2,600,973 6/1952 Comte .......................... 324/57 X

| 2,671,198 | 3/1954 | Beverly ...................... | 324/57 |
| 3,051,896 | 8/1962 | Bieganski ..................... | 324/81 X |
| 3,217,248 | 11/1965 | Itzkan ........................... | 324/81 |
| 3,427,535 | 2/1969 | Welsh ........................... | 324/57 |
| 3,432,752 | 3/1969 | Frederickson et al. ....... | 324/57 |

OTHER REFERENCES

Time Interval Measurements and How to Make Them in Date File, Beckman, Feb. 10, 1958, pp. 1–4. (Copy in Group 430 Class 73–5.)

Primary Examiner—Edward E. Kubasiewicz
Attorney—Charles C. Krawczyk

ABSTRACT: An oscillator circuit applies variable-frequency test signals to a resonant circuit in a manner to sweep across the band-pass of the resonant circuit. A control pulse is generated while the resonant circuit transmits the test signals above a preset amplitude. The control pulse is processed to provide an indication of the response of the resonant circuit to the test signals.

INVENTOR.
ORHAN TURAN

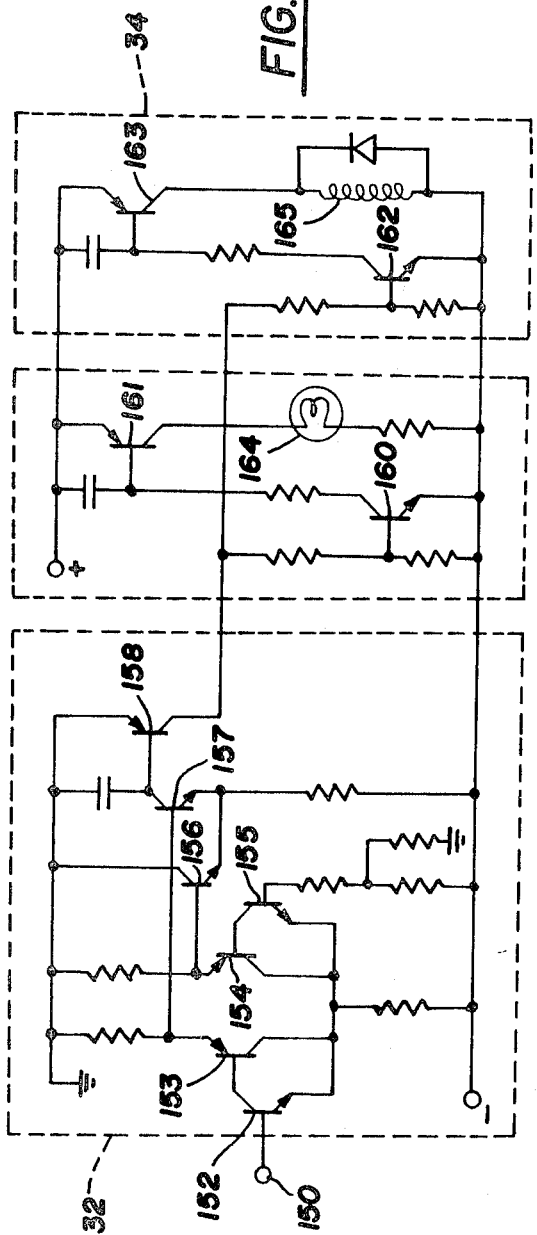
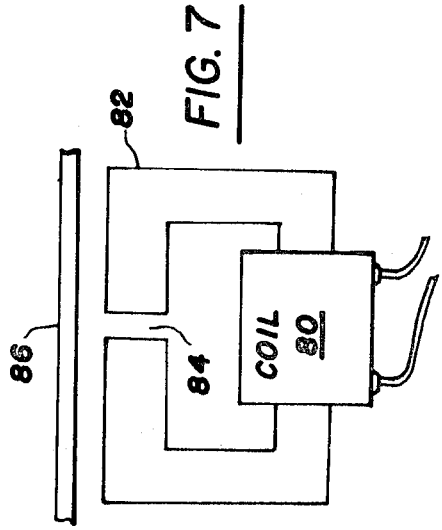
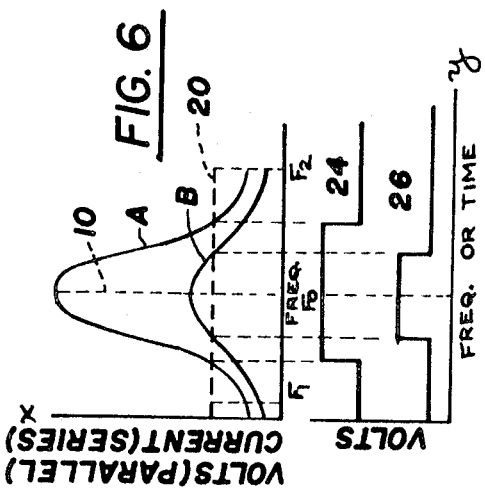
INVENTOR.
ORHAN TURAN

INVENTOR.
ORHAN TURAN 3,624,494

APPARATUS FOR MONITORING THE RESPONSE OF A RESONANT CIRCUIT

BACKGROUND

This invention relates to apparatus for measuring the frequency response of resonant circuits in general, and more particularly to apparatus for measuring the Q (quality) and/or changes in the Q of a resonant circuit.

In order to measure the Q of an inductor or capacitor, the test component is connected in a resonant circuit having known standard components and the response of the resonant circuit (with the test component) provides an indication of the Q of the component. The Q of a resonant circuit is defined as the inductive impedance divided by the circuit resistance.

In the prior art, apparatus used for determining the Q of a component generally required a bridge circuit, or a phase detection circuit, to provide a signal corresponding to the Q of the circuit or component therein. The bridge circuit generally requires a manual adjustment, or a motor-driven adjustment in the case of automatic apparatus. The phase detector circuit is amplitude sensitive requiring the amplitude from the signal source to be maintained at a constant level for accurate results. Furthermore, the phase detector circuit is subject to temperature changes requiring extensive temperature compensation. In any event, it is expensive, if not impractical, to use such apparatus to provide an automatic system for measuring circuit Q, and/or detecting changes in circuit Q.

It is therefore an object of this invention to provide a new and improved apparatus for automatically measuring the response of a resonant circuit.

It is also an object of this invention to provide a new and improved apparatus for automatically detecting a change in the response of a resonant circuit.

It is a still further object of this invention to provide a new and improved apparatus for automatically measuring the resonant frequency of a resonant circuit.

It is a still further object of this invention to provide a new and improved apparatus for automatically measuring the Q of a resonant circuit and/or detecting changes in the Q of a resonant circuit.

It is another object of this invention to provide a new and improved apparatus for using changes in the response of a resonant circuit to provide means for detecting the nature, size, shape, or presence of an object.

BRIEF DESCRIPTION OF THE INVENTION

Circuit means applies variable-frequency test frequencies to a resonant circuit in a manner to sweep across the band-pass of the resonant circuit. The test signals passed or transmitted by the resonant circuit are monitored for generating a control pulse while the resonant circuit transmits the test signals above a preset amplitude. Circuit means measure the time duration of the pulse to provide an indication of the response of the resonant circuit to the test frequencies.

In a particular embodiment of the invention the test frequencies are supplied by a controllable oscillator. A periodic ramp ro sawtooth control signal is applied to the oscillator to provide a frequency-modulated test signal.

In a first embodiment of the invention the control pulse is averaged or integrated to produce a direct current signal corresponding to the Q of the resonant circuit. The direct current signal is applied to an indicator device to provide a measurement of circuit Q and/or denote a change in circuit Q.

In a second embodiment of the invention, the control pulse provides a gate signal for enabling a digital circuit to measure clock signals to provide a digital indication of the circuit Q and/or changes in circuit Q.

A further feature of the invention includes circuit means responsive to the control pulse for automatically measuring the resonant frequency of the resonant circuit.

DESCRIPTION OF THE FIGURES

FIG. 5 is a detailed schematic diagram of an embodiment of a comparator circuit and a driver circuit for the block diagram of FIG. 1.

FIG. 6 includes waveforms for explaining the operation of the apparatus embodying the invention.

FIG. 7 is an embodiment of an inductor for use in the resonant circuits of FIGS. 1, 2 and 4 when the apparatus is used for detecting the presence, shape, etc., of an object.

DESCRIPTION OF THE PREFERRED EMBODIMENTS OF THE INVENTION

The apparatus of the invention uses the universal resonance curve of a single-tuned resonant circuit to provide an automatic Q meter and/or an automatic control system for measuring and/or detecting the presence, size, or location of objects. The universal resonance curve can be defined as the response of a series or parallel inductor-capacitor (LC) circuit as a function of a band of signal frequencies applied thereto. The amplitude of the signal voltages developed across a parallel circuit, and the amplitude of signal currents developed in a series circuit, follows a generally bell-shaped curve having a maximum amplitude at the resonance frequency ($F_o$) and drops off on either side of the resonance frequency. The sharpness of resonance, i.e., the relative magnitude of the curve, depends upon the Q factor of the resonant circuit.

The sharpness of resonance depends primarily on the ratio of the total circuit inductive reactance to the total circuit resistance and is designated by the symbol Q, or quality. The resonance curve A of FIG. 6 has a relatively low resistance (R) and a relatively high Q. If the resistance in the circuit is increased, the curve B (FIG. 6) is obtained with a lower Q and reduced sharpness of resonance. The center or peak amplitude frequency designated by the dashed line 10 is the resonant frequency ($F_o$) of the circuit.

Figure 1:
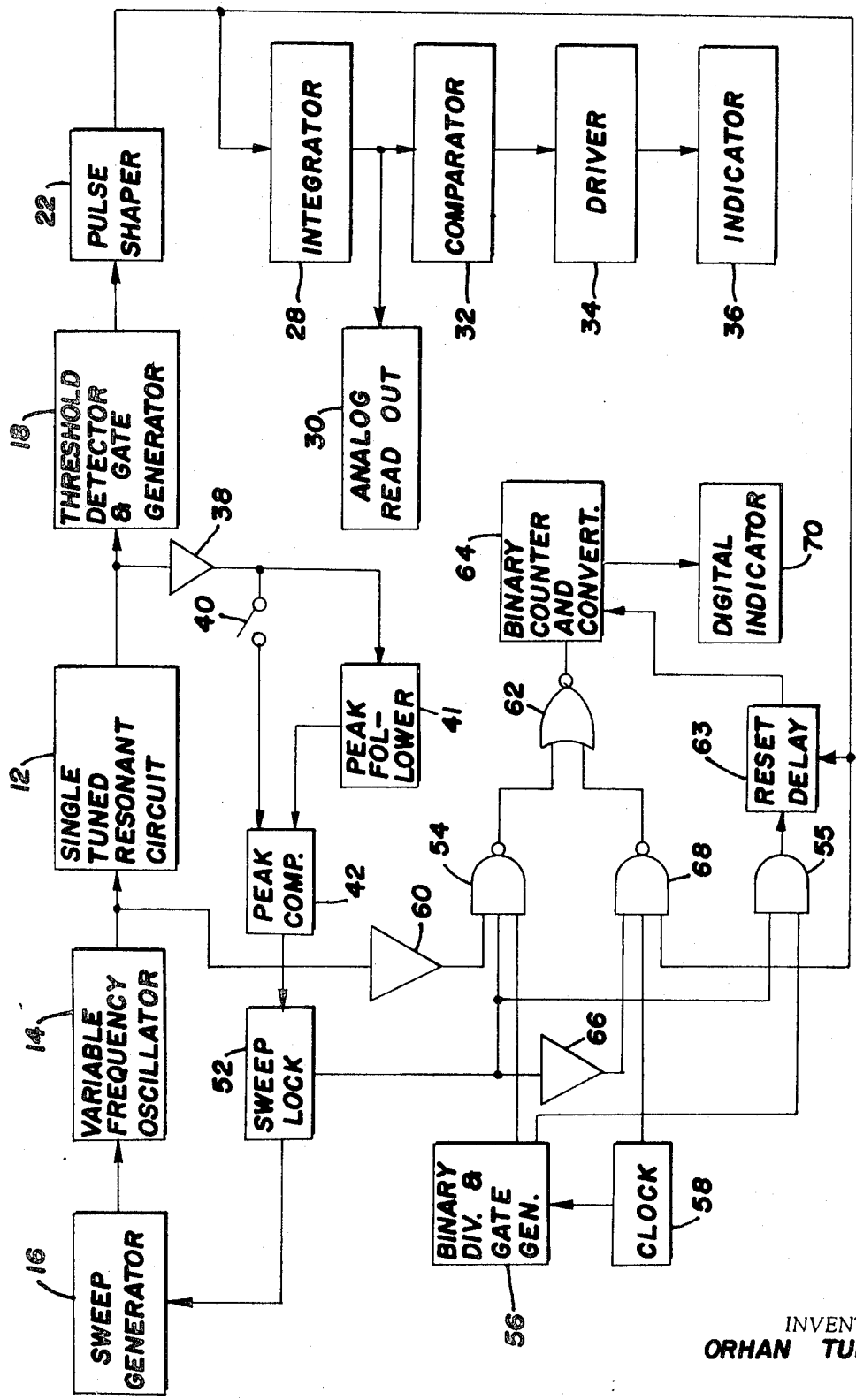
FIG. 1 is an overall block diagram of a first embodiment of the invention including analog and digital readouts.

Referring now to the block diagram of FIG. 1, a single-tuned resonant circuit 12 (series or parallel RLC circuit) is coupled to receive periodic signals from a variable-frequency oscillator circuit 14. The oscillator circuit 14 is variable to provide a series of sequential signal frequencies (frequency modulated signals) covering a test range of frequencies ($F_1$-$F_2$ of FIG. 6) that exceeds the band-pass of the resonant circuit 12. The oscillation is controlled by a sweep generator circuit 16 to generate a variable-frequency signal that sweeps through the test range of frequencies at a predetermined rate and in a preset manner.

In the embodiment of the invention of FIG. 1 the oscillator circuit 14 is defined as voltage-controlled oscillator and the sweep generator circuit generates a periodic ramp voltage. A ramp voltage or signal is a waveform wherein the magnitude of the signal increases at a substantially constant rate for a given period and then rapidly drops to its initial value. The ramp signal controls the oscillator to produce a periodic or alternating output signal that periodically sweeps through the test range of frequencies at a substantially constant rate. It is to be understood, however, that other waveforms, such as sawtooth, could be also used. Furthermore, it is to be understood that the oscillator circuit 14 can be any type of variable oscillator circuit, such as for example, inductively or capacitively tunable oscillators, phase lock stabilized tunable oscillators, a series of tunable oscillators each covering different ranges that are electronically activated sequentially, or a combination of two tunable oscillators with their outputs mixed and filtered to produce difference frequencies, etc.

A threshold detector and gate generator circuit 18 is coupled to monitor the signal passed, or transmitted, by the resonant circuit 12. If the resonant circuit is a parallel RLC circuit, the voltage developed across the circuit is monitored. On the other hand, if the resonant circuit is a series RLC circuit, the current flow through the circuit is monitored. The threshold detector and gate circuit 18 detects when the amplitudes of the transmitted signals exceed a preset level (dashed line 20, FIG. 6) and generates a gate or control signal while sequential cycles of the signal exceed the preset level. The gate signals are applied to a pulse shaper circuit 22 to form the gate signals into the constant amplitude square waves 24 and 26 (FIG. 6) having rapid rise and fall times.

Since sweep generator circuit 16 controls the oscillator output with a ramp signal and the frequency of oscillation changes at a preset rate, the time the transmitted signal exceeds the preset amplitude provides a measure of the Q of the resonant circuit 12. As illustrated in FIG. 6, the square wave 24 corresponds to the gate signal generated for the high Q resonance curve A, while the shorter duration gate signal 26 corresponds to the low Q resonance curve B. If frequency of the signal from the oscillator changes at a constant rate, the time duration difference between the gate signals 24 and 26 provides a direct comparison between the Q of the two circuits.

The response of the resonant circuit 12 to the applied frequencies can be measured, or monitored, with either of the illustrated analog or digital circuits, or both. The use of the analog or digital circuit depends upon the desired accuracy of measurement and function for which the apparatus is to be used.

In the analog circuit, the gate pulses are applied to an integrator circuit 28 to provide a filtered direct current signal that is a function of the time duration of the gate signal. The direct current signal is applied to an analog indicator 30, such as a recorder or meter, to provide a indication of the Q of the resonant circuit 12. The direct current signal from the integrator circuit 28 is also applied to a comparator circuit 32 that provides an output signal when the magnitude of the direct current signal exceeds a preset level. The comparator output signal is applied through a driver circuit 34 to actuate an indicator device 36, such as, for example, a light bulb or a relay.

The digital circuit of FIG. 1 measures circuit Q and/or detects changes in circuit Q and also provides an indication of the resonant frequency of the resonant circuit. The resonant frequency is measured by closing a switch 40. The signals transmitted by the resonant circuit 12 are applied through an isolation amplifier 38 to a peak follower circuit 41. The peak follower circuit 41 provides an output signal that follows the contour of the bell-shaped curve (FIG. 6). The output signal from the peak follower circuit 41 is applied to one input circuit of a peak comparator circuit 42. The other input circuit of the peak comparator circuit 42 is coupled to the amplifier 38 through the switch 40. The peak comparator circuit 42 detects when the response of the resonant circuit first begins to attenuate from the peak value to apply to control signal to a sweep lock circuit 52. The peak follower and peak comparator circuits are more fully described in a later portion of the specification with regards to FIG. 8.

The sweep lock circuit 52 applied a control signal to stop and hold the sweep generator 16 to maintain the oscillator 14 at the resonant frequency. The sweep lock circuit 52 also applies an enable signal to a NAND-gate 54 and an AND-gate 55. A binary divider and gate circuit 56 is connected to a clock circuit 58 to produce fixed duration time pulses, such as, for example, 1- to 100-millisecond pulses. The time pulses are applied to another input circuit of the NAND-gate 54 and the AND-gate 55. The third input circuit of the NAND-gate 54 is coupled to receive signals from the oscillator circuit 14 through an amplifier circuit 60.

When enabled, the NAND-gate 54 applies pulses from the oscillator 14 (held at a constant frequency) through a NOR-gate 62 to a binary counter and converter circuit 64. The binary counter and converter circuit counts the signal pulses generated by the oscillator for the duration of the time pulse, thereby providing an output count to a digital indicator 70 corresponding to the resonant frequency. It should be noted that the sweep lock circuit 52 is also connected through an inverter circuit 66 to an input circuit of an NAND-gate 68, and disables the NAND-gate 68 when the sweep is locked.

When measuring the resonant frequency, the binary counter and converter circuit 64 is reset shortly after each trailing edge of the time pulses. A reset circuit 63, coupled to the AND-gate 55, produces a delayed reset pulse shortly after the time pulse ends. The delay is sufficient for the stored pulses in the binary counter and converter circuit 64 to be shifted to the digital indicator 70.

When measuring the Q of the resonant circuit 12 with the digital circuit, the switch 40 is left open. The sweep lock circuit 52 is disabled and inverter circuit 66 now applies an enabling signal to the input circuit of the NAND-gate 68. The clock circuit 58 is coupled to another input circuit of the NAND-gate 68. The third input circuit of the NAND-gate is coupled to the pulse shaper circuit 22 to receive the gate signals. When a gate pulse is initiated the NAND-gate 68 is enabled to pass clock pulses through the NOR-gate 62 for counting by the binary counter and converter circuit 64. The binary counter and converter circuit provides a reading to the digital indicator 70 corresponding to the duration of the gate pulses and therefore the Q of the resonant circuit. The binary counter and converter circuit is reset after the trailing edge of gate signal by the reset delay circuit 63.

When operating the apparatus of FIG. 1 as a Q meter, standard known resonant circuit components are connected and the analog and/or digital indicators are precalibrated to provide readings directly in circuit Q. The Q of unknown resonant circuits are now measured by merely substituting the unknown circuits into the apparatus. The Q of individual unknown inductive and capacitive components are tested by connecting the unknown inductor or capacitor with a known capacitor or inductor, respectively, to form the single-tuned resonant circuit. Since the Q of a resonant circuit is a function of the resistance of the circuit, resistance can also be determined.

The apparatus of FIG. 1 also functions as a detection device. The detection can be accomplished by either the analog or digital circuit, or both. It is well known that the Q of a resonant circuit can be changed by introducing an object near the inductor of a resonant circuit, which in turn changes the flux path and therefore the Q of the circuit. The resonant circuit inductor in such cases would be built in a shape and size determined by its particular use. For example, the inductor can comprise a 1 foot diameter coil embedded in a road as a traffic detection device. The presence of an automobile in the field of the coil increases the inductance of the circuit and therefore increases the Q of the circuit. The increased Q is reflected as a increase in the time duration of the gate pulses. The analog indicator device 36 or digital indicator 70 will be actuated denoting the presence of the automobile. The digital indicator 70 can include a circuit that provides a signal after a predetermined count is reached, corresponding to the presence of the automobile.

The inductor can also be built in the form of a coil 80 (FIG. 7) wrapped about a core 82 of transformer iron. An airgap 84 is cut into the core. When an object 86 is placed in, or in the vicinity of, the airgap 84, the permeability of the medium in the vicinity of the airgap is changed, the Q of the coil changes and the presence of the object 86 is detected. The size and shape of the object 86 relative to the airgap are also factors for varying the Q of the resonant circuit. Accordingly, the apparatus of the invention will also provide an indication of changes in the shape of thickness of the object. The apparatus of the invention therefore can be used to detect the presence of objects, or measure or detect changes in the size and shape of objects as well as functioning as a Q-meter.

Figure 3:
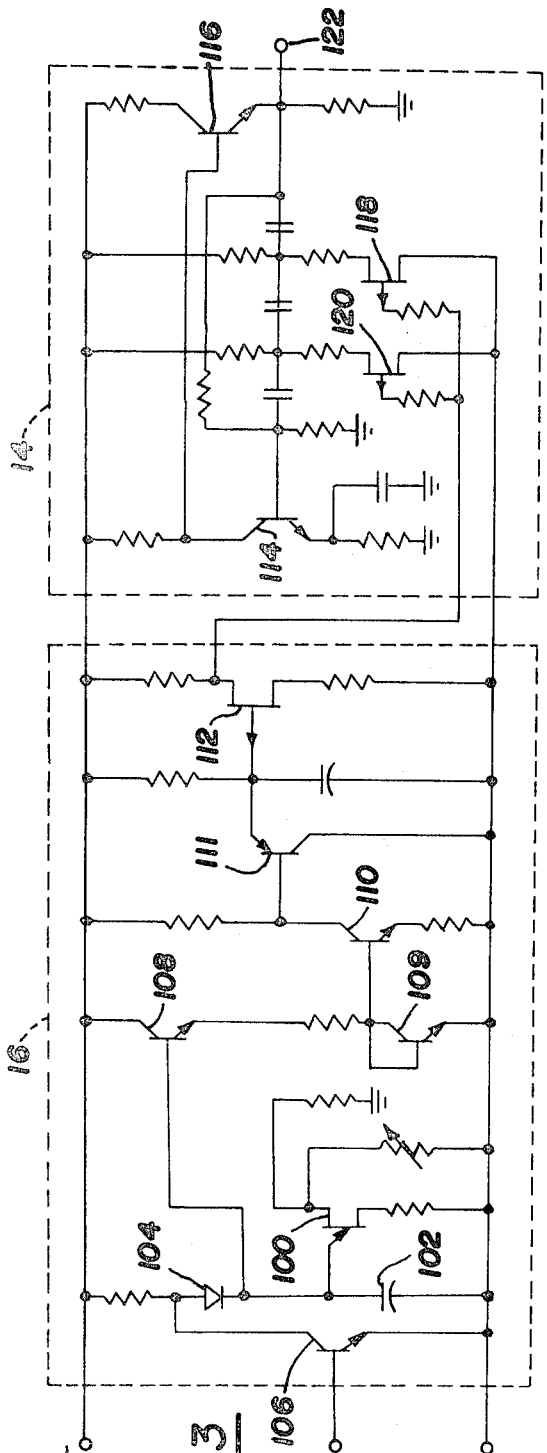
FIG. 3 is a detailed schematic diagram of an embodiment of a sweep generator and oscillator circuit for the block diagram of FIG. 1.

In the schematic diagram of FIG. 3, the sweep generator 16 includes a unijunction transistor 100 connected as a relaxation oscillator. A periodic ramp signal is generated across a capacitor 102 as it charges through a diode 104 and discharges through the unijunction transistor. When the sweep lock circuit 52 (FIG. 1) is in operation, a transistor 106 is saturated and stops the capacitor 102 from charging. The diode 104 prevents the capacitor 102 from discharging and the relaxation oscillator is held in that portion of its cycle.

The ramp signals generated across the capacitor 102 are amplified by a direct current amplifier circuit including the transistors 108–112 and are applied to a voltage-controlled oscillator circuit 14. The oscillator circuit includes the transistors 114 and 116 connected as a RC oscillator. The frequency of oscillation is controlled by the impedance presented by the field effect transistors 118 and 120. As the amplitude of the ramp signal increases, the frequency of oscillation increases. When the ramp signal drops off to its initial value, the oscillator rapidly returns to its initial frequency. Accordingly, the oscillator provides a sinusoidal output signal at the terminal 122 that changes in frequency in accordance with the ramp signal to repetitively scan across the test band of frequencies $F_1$–$F_2$ (FIG. 6).

Figure 4:
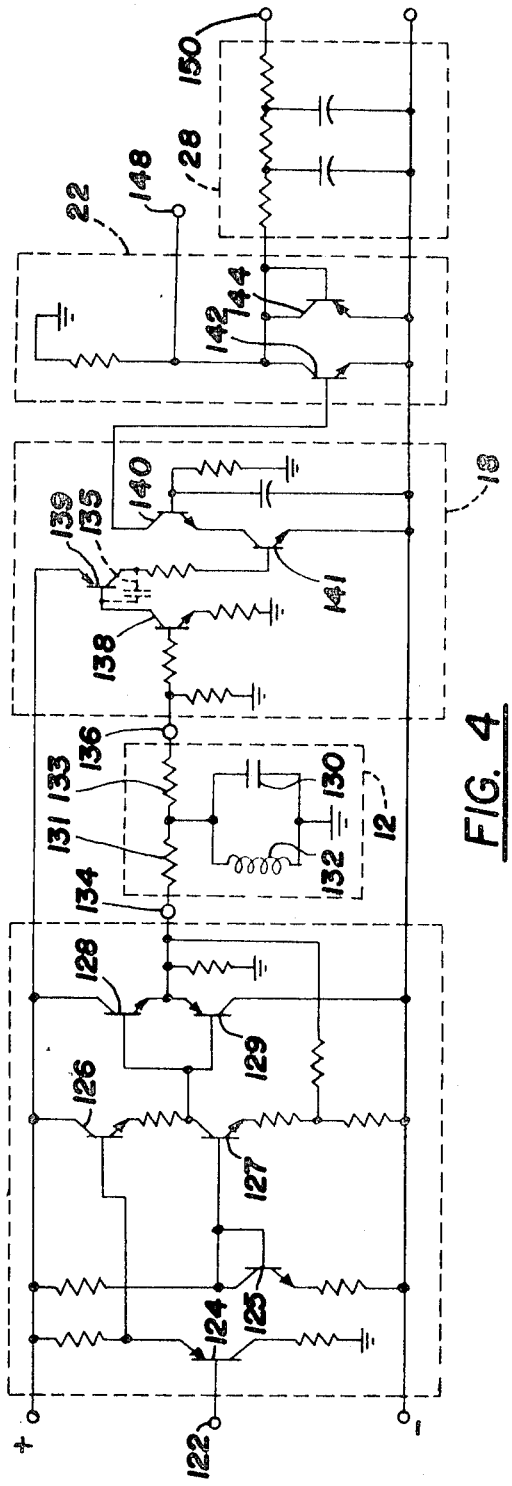
FIG. 4 is a detailed schematic diagram of an embodiment of an amplifier circuit for applying amplified oscillator signals to the resonant circuit, a threshold circuit, a pulse shaper circuit and an integrator circuit for the block diagrams of FIGS. 1 and 2.

The oscillator signals are amplified by a direct current amplifier circuit (FIG. 4) including the transistors 124–129 and are applied to the resonant circuit 12. The resonant circuit includes a capacitor 130 and inductor 132 connected in a parallel circuit through the resistors 131 and 133 and between the terminals 134 and 136. It is to be understood that the resonant circuit can also comprise a series LC circuit and the connections changed accordingly. Furthermore, in the case of a Q-meter, the capacitor 136 or inductor 132 can be known standard units for testing the Q of the circuits with unknown components. In the case of detection apparatus, the inductor 132 can comprise a loop detector or the iron core coil of FIG. 7.

The signal translated or transmitted by the resonant circuit 12 is applied to the threshold detector and gate circuit 18 including the transistors 138–141. When the amplitude of a positive portion of a cycle of signal translated by the resonant circuit 12 reaches a preset threshold limit, the transistor 138 turns on rendering the transistor 139 conductive. On the negative portion of the cycle, the transistor 138 turns off. The transistor 139, however, keeps conducting due to the base to collector internal capacitance 135. The RC time constant of the discharge path is selected to be longer than one-half cycle of the oscillator signals. The transistor 139 therefore keeps conducting as long as the subsequent positive half cycles are greater than the threshold level. If the amplitude of the next succeeding cycle is less than the threshold level, the internal capacitance of the transistor 139 is discharged and the transistor cuts off. Accordingly, a pulse is generated as long as the amplitude of consecutive signals from the resonant circuit are above a preset level.

The output pulse from the threshold circuit 18 is applied to the pulse shaper circuit 22 including the transistors 142 and 144. The pulse shaper circuit functions to provide an output pulse on the terminal 148 corresponding to square waves 24 and 26 of FIG. 6 having constant amplitudes and very sharp rise and fall times. The signal from the pulse shaper circuit is also applied to the resistor-capacitor (RC) integrator circuit 28 to provide a direct current output signal at the terminal 150.

The integrated signal from terminal 150 is applied to the analog indicator 30 (FIG. 1) and also to the input circuit of the comparitor circuit 32 including the transistors 152–158 (FIG. 5). When the amplitude of the integrated signal exceeds a present level, the transistor 158 is rendered conductive and enables the transistors 160 and 161, and 162 and 163 (of the driver circuits 34) to energize a light 164 and a relay 165, respectively. The light 164 and the relay 165 provide an indication that the Q of the resonant circuit 12 is above or below a preset limit, or alternatingly the presence or absence, or change in size, material, etc., of an object near the inductor 132. For example, if the apparatus of the invention is a traffic detector, the presence of an automobile in the vicinity of the inductor will change the Q of the resonant circuit and provide an indication on the lamp 164 and relay 165. By various modifications of the inductance in the resonant circuit, the apparatus of the invention can be used in automatic production apparatus to denote a change in the shape, size or nature of a product, or as a detector such as a mine detector or traffic detector, or as an electronic micrometer to measure the thickness of paper, etc.

Figure 2:
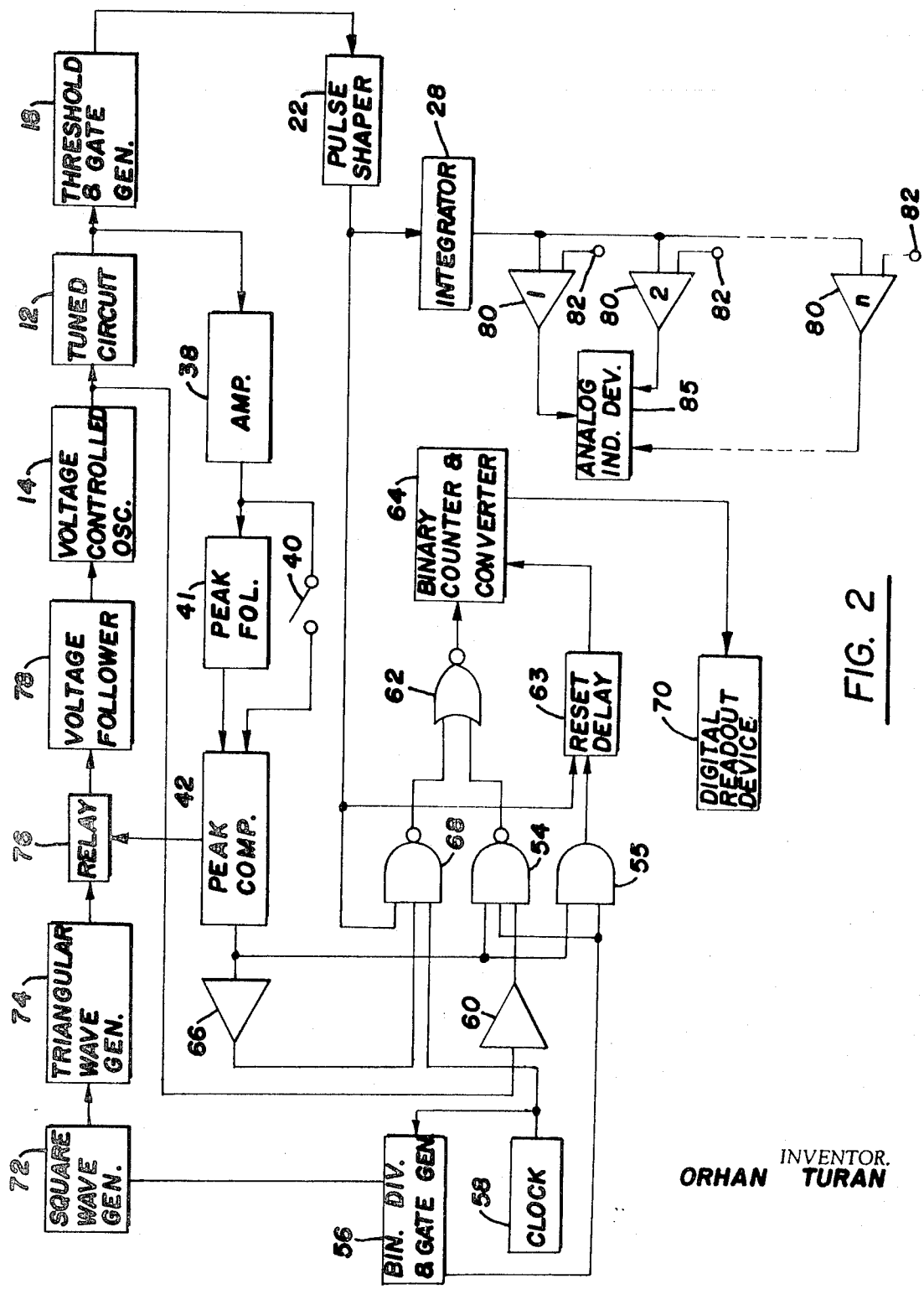
FIG. 2 is an overall block diagram of a second embodiment of the invention.

In order to symplify the description of the second embodiment of the invention, components in the block diagram of FIG. 2 similar to that of FIG. 1 are designated by the same reference numerals. In FIG. 2, time pulses from the binary divider and gate generator 56 are applied to a square wave generator 72 to generate periodic square waves. The square waves are applied to a triangular wave generator 74 to develop symmetrical triangular or sawtooth type of waveforms having substantially equal increasing and decreasing slopes. The output from the triangular wave generator 74 is applied through a relay 76 to a voltage follower circuit 78, which in turn controls the frequency of the voltage-controlled oscillator 14 with the triangular wave. The oscillator 14 produces a frequency-modulated signal that varies in frequency to sweep back and forth across the band-pass of the tuned circuit 12 at a substantially constant rate in both directions of increasing and decreasing frequencies. The threshold detector and gate circuit 18 and the pulse shaper circuit 22 function in the same manner as set for with regards to FIG. 1.

The gate pulses from the pulse shaper circuit 22 are processed by the digital circuit in essentially the same manner as set forth with regards to FIG. 1. However, in FIG. 2 the peak comparator circuit 42 is connected to actuate the relay 76 at resonant frequency or peak amplitude (rather than the transistor 106 of FIG. 3). When the relay 76 is actuated, the voltage follower 78 holds the level of input signal corresponding to that received from the generator 74 at the time the relay was actuated, and maintains the oscillator frequency fixed (resonant frequency).

The gate pulses from the pulse shaper circuit 22 are also applied through the integrator circuit 28 to one input circuit of a plurality of analog comparator circuits 80 (designated 1-n). A different reference potential is applied to the other input circuit 82 of each of the comparator circuits so that the comparator circuits are actuated at a different values of Q thereby providing a step by step indication of changes in Q.

Figure 8:
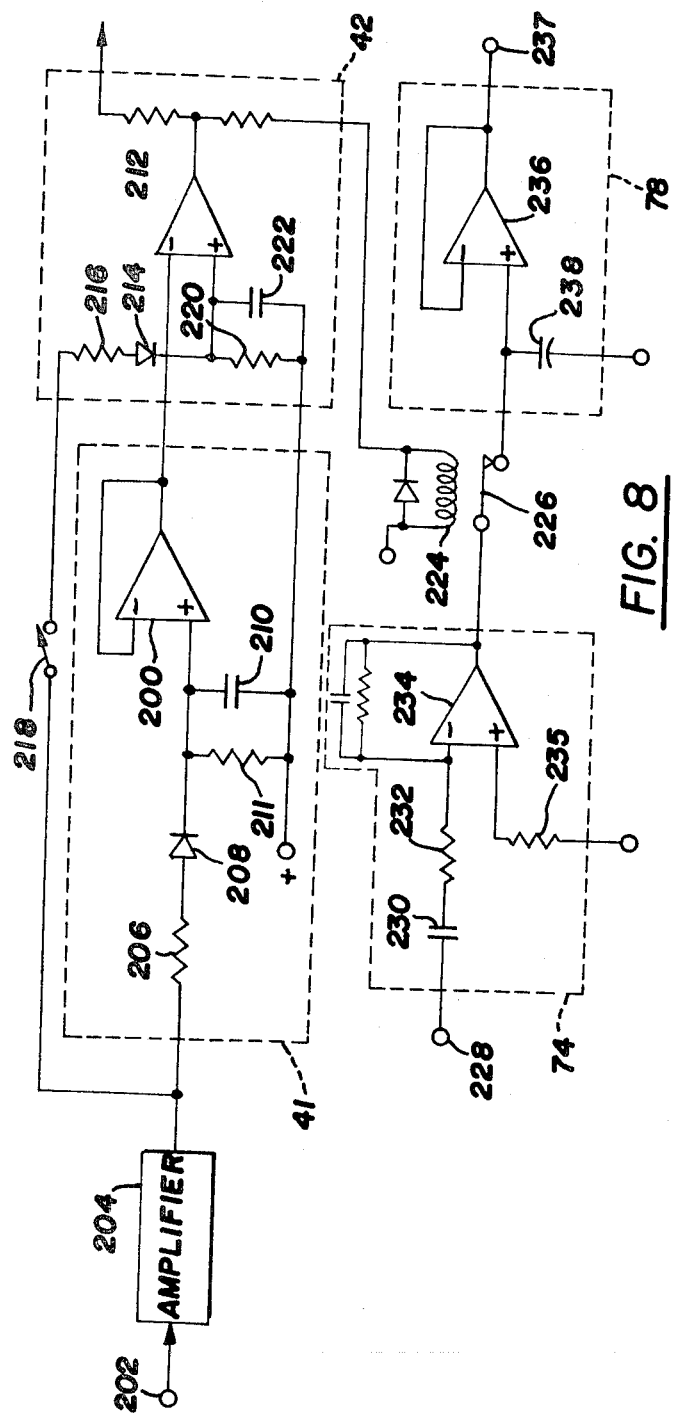
FIG. 8 is a schematic diagram of an embodiment of a peak detector circuit for the block diagrams of FIGS. 1 and 2.

The embodiment of the peak follower circuit 41 circuit of FIG. 8 includes a direct current, unity gain, operational amplifier 200. Signals translated by the resonant circuit are applied to the terminal 202, amplified by the amplifier 204 and are applied to an input circuit of the amplifier 200 through a resistor 206 and a diode 208. The diode 208 rectifies the signals to develop a signal across the capacitor 210 and the resistor 211 corresponding to the peak amplitude of the resonant circuit response.

The peak comparator circuit 42 includes a direct current operational amplifier 212 having one input circuit connected to the output circuit of the amplifier 200 and the other input circuit through a diode 214 and resistor 216 and a switch 218 to the output circuit of the amplifier 204. A charging circuit including the resistor 220 and capacitor 222 are also connected to the input circuit. After the switch 218 is closed and the amplitude of the signal from the resonant circuit reaches a maximum and begins to decrease, the relative magnitude of the signal applied to the input circuits of the amplifier 212 reverses to produce a control signal that energizes the relay 224.

The contacts 226 of the relay 224 are connected between the triangular wave generator circuit 74 and the voltage follower circuit 78. The square wave pulses from the square wave generator 72 are applied to the terminal 228 and through the series capacitor 230 and resistor 232 to an input circuit of an operational amplifier circuit 234. The other input circuit is connected to a source of reference potential through a resistor 235. The circuit functions to convert the square waves into the symmetrical triangular waves. The triangular waves are applied to an input circuit of an operational amplifier 236 connected as a unity gain amplifier and across a storage capacitor 238. The output of the amplifier 236 follows the input triangular signal and is connected through the terminal 237 to the voltage controlled oscillator circuit. The input impedance of the amplifier 236 is very high. When the contacts 226 open, the capacitor 238 remains charged at the signal level input at the time the contacts opened, thereby holding the output at the terminal 237 at the same constant level and maintaining the frequency of the oscillator circuit constant (resonant frequency).

Figure 9:
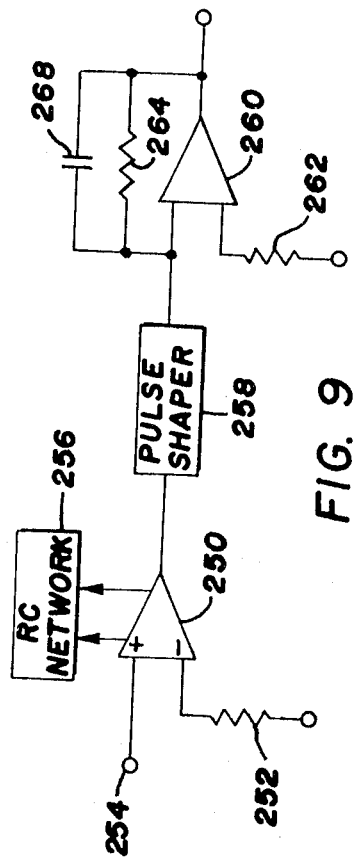
FIG. 9 is a schematic diagram of a second embodiment of the threshold and gate generator circuits and integrator circuits of the block diagrams of FIGS. 1 and 2.

In FIG. 9 the threshold detector and gate generator circuit includes a direct current operational amplifier circuit 250. One input circuit of the amplifier circuit is connected to a reference potential source through a resistor 252. The other input circuit of the amplifier is connected to a terminal 254 for receiving the signals translated by the resonant circuit 12. An RC network 256 is connected to the operational amplifier to provide a slower response time. The time constant (T) of the network is chosen to be essentially equal to $½F_o < RC < 1/F_o$ where $1/F_o$ is the period of the resonant frequency. The response time of the amplifier is selected so that when the amplitude of the input signal on a positive half cycle exceeds a preset level, a pulse is generated by the amplifier that continues for slightly less than full cycle of the signal. If the positive portion of the next succeeding pulse does not reach the preset level, the pulse ends.

The output from the amplifier 250 is applied to a conventional pulse shaper circuit 258 to provide a constant-amplitude pulse with sharp rise and fall times. The pulse from the pulse shaper circuit 258 is applied to an integrator circuit including a direct current operational amplifier 260. One input circuit of the amplifier circuit 260 is connected through a resistor 262 to a reference source, while another input circuit is connected to the pulse shaper circuit. A resistor 264 and a capacitor 268 are connected in parallel to provide a feedback circuit so that the circuit functions to integrate the gate pulses and provides a direct current signal corresponding to the Q of the resonant circuit.

The embodiments of the invention do not require high-tolerance components. The construction of the circuit is relatively simple and inexpensive. Furthermore, the circuit is relatively insensitive to amplitude variations beyond the threshold circuit. The circuit can be used as an automatic Q-meter providing analog and/or digital readings, or can be tied in with a computer generate complicated operations. The circuit has the advantage that it requires no moving parts, functions accurately, and once precalibrated, will provide automatic operation for extended periods of time.

I claim:

1. Apparatus for determining the response of a resonant circuit to frequency-modulated signals comprising:
   first circuit means for providing frequency modulated signals;
   resonant circuit means, exhibiting a frequency band-pass characteristic including at least a portion of said frequency-modulated signals, coupled to receive said frequency-modulated signals for translation thereof;
   second circuit means coupled to said resonant circuit means for determining when the amplitude of the frequency-modulated signals translated by said resonant circuit means is above a preset level greater than zero and generating a test signal having a time duration corresponding to the time period the signal translated by said resonant circuit means exceeds said preset level, and
   third circuit means coupled to said second circuit means for measuring the duration of said test signal to provide an indication of the response of said resonant circuit means to said frequency-modulated signals.

2. Apparatus as defined in claim 1 wherein said first circuit means includes:
   variable-frequency oscillator means for generating a cyclic output signal, and
   control circuit means coupled to said oscillator means for varying the frequency of said output signal to traverse the band-pass of said resonant circuit means.

3. Apparatus as defined in claim 2 wherein:
   said control circuit means controls said oscillator means so that the frequency of said output signal is varied to periodically traverse the band-pass of said resonant circuit means;
   said second circuit means generates a separate test signal each time said output signal traverses the band-pass of said resonant circuit means and while the amplitude of the frequency-modulated signals translated by said resonant circuit means is above said preset level, and
   said third circuit means includes a converter circuit for converting the duration of said test signal into digital pulses and a counter circuit for counting said digital pulses to provide an indication of the response of said resonant circuit means.

4. Apparatus as defined in claim 2 wherein:
   said control circuit means controls said oscillator means so that the frequency of said output signal is varied to periodically traverse the band-pass of said resonant circuit;
   said second circuit means includes a threshold circuit means for detecting when the amplitude of the signal received from said resonant circuit means exceeds said preset level and generating a substantially constant amplitude test signal each time said output signal traverses the band-pass of said resonant circuit and while the amplitude of the signal received from said resonant circuit means exceeds said preset level, and
   said third circuit means includes an integrator circuit for converting the time duration of said test signals into a direct current signal providing an indication of the response of said resonant circuit means.

5. Apparatus as defined in claim 1 including:
   circuit means coupled to said resonant circuit means for detecting when the frequency of said frequency-modulated signals is at the resonant frequency of said resonant circuit means to generate a control signal, and
   circuit means responsive to said control signal for measuring the frequency of said frequency-modulated signals provided by said first circuit means, to provide an indication of the resonant frequency of said resonant circuit means.

6. Apparatus as defined in claim 4 wherein:
   said oscillator means provides a substantially sinusoidal signal, and
   said threshold detector continues to provide said test signal as long as the amplitude of two consecutive cycles of the signal translated by said resonant circuit means exceeds said preset level.

7. Apparatus for providing an indication of the Q of a resonant circuit comprising:
   a controllable oscillator circuit for providing a periodic signal, the frequency of which is a function of a control signal applied thereto;
   circuit means for receiving circuit elements for forming a resonant circuit;
   control circuit means, coupled to apply control signals to said oscillator circuit for varying the frequency of said periodic signal to scan a preset range of frequencies including the resonant frequency of said resonant circuit;
   circuit means for applying said periodic signal to said resonant circuit for translation thereof;
   threshold circuit means coupled to said resonant circuit for determining when the amplitude of the periodic signal translated by said resonant circuit exceeds a preset level greater than zero and generating a test signal corresponding to the time period the signal translated by said resonant circuit exceeds said preset level, and circuit means measuring the time duration of said test signal for providing an indication of the Q of said resonant circuit.

8. Apparatus as defined in claim 7 including:

switching circuit means coupled to said circuit means for receiving said circuit elements for forming the resonant circuit for monitoring the amplitude of the signals translated by the resonant circuit and providing a control signal when a decrease in signal amplitude is detected, and circuit means coupled to said oscillator circuit and said switching circuit means for measuring the frequency of said oscillator circuit in response to the occurrence of said control signal.

9. Apparatus as defined in claim 7 wherein said circuit means responsive to said test signal includes:

circuit means for integrating said test signal to provide a direct current signal having a magnitude corresponding to the time duration of said test signal, and indicator means receiving said direct current signal for providing an indication of the Q of the resonant circuit.

10. Apparatus as defined in claim 7 wherein said circuit means responsive to said test signal includes:

integrator circuit means for integrating said switching signal to provide a direct current signal having a magnitude corresponding to the time duration of said test signal, and a switching circuit coupled to said integrator circuit responsive to the magnitude of said direct current signal for providing an indication when the Q of said resonant circuit is above or below a preset value.

11. Apparatus as defined in claim 8 wherein said circuit means responsive to said switching signal includes:

a clock circuit for providing clock pulses;

a countercircuit, and switching circuit means coupled to said threshold circuit means, said clock circuit and said countercircuit for applying the clock pulses to said countercircuit for the duration of said test signal so that said counter circuit provides an indication of the Q of the resonant circuit.

12. Apparatus for determining the frequency response characteristics of a resonant circuit comprising:

first circuit means for providing frequency-modulated cyclic signals;

second circuit means adapted to be connected to a resonant circuit;

third circuit means for applying the frequency-modulated signals to said second circuit means for translation by a resonant circuit connected to said second circuit means;

peak detection circuit means including a pair of rectifier circuits coupled to separate filter circuits, wherein said rectifier circuits are coupled to said second circuit means for rectifying the signal translated by a resonant circuit connected to said second circuit means and including comparison circuit means coupled to receive filtered rectified signals from said filter circuit and generating a switching signal when a decrease in the translated signal amplitude occurs;

fourth circuit means responsive to said switching signal, coupled between said first circuit means and said peak detection circuit means, for controlling said first circuit means for maintaining the frequency of the cyclic signals substantially constant at its frequency at the time of the occurrence of said switching signal, and fifth circuit means for measuring said substantially constant frequency in response to said switching signal.

13. Apparatus for determining the frequency response of a band-pass resonant circuit comprising:

circuit means for applying a cyclic signal to said resonant circuit that varies in frequency at a preset rate to traverse the band-pass of said resonant circuit;

circuit means coupled to said resonant circuit for determining when the amplitude of the cyclic signal passed by the resonant circuit exceeds a preset amplitude greater than zero and providing a control signal having a time duration corresponding to the time period the signal translated by said resonant circuit exceeds said preset level, and circuit means receiving said control signal and measuring the time duration of said control signal.

14. Apparatus for detecting a change in the frequency response of a band-pass resonant circuit comprising:

circuit means for applying a cyclic signal to said resonant circuit that varies in frequency in a predetermined manner to traverse the band-pass of said resonant circuit;

circuit means coupled to said resonant circuit for determining when the amplitude of the cyclic signals passed by said resonant circuit exceeds a preset amplitude greater than zero and providing a control signal having a time duration corresponding to the time period the signal translated by said resonant circuit exceeds said preset level, and circuit means coupled to receive said control signal for measuring a change in the time duration of said control signal.

15. A method of determining the Q of a band-pass resonant circuit comprising the steps:

scanning the resonant circuit with frequency-modulated signals to traverse the band-pass of said resonant circuit;

determining when the amplitude of the frequency-modulated signals translated by the resonant circuit exceed a preset level greater than zero;

generating a test signal having a time duration corresponding to the time period the signal translated by said resonant circuit exceeds said preset level;

measuring the time duration of said test signal, and converting the time duration of said test signal into an indication of the Q of the resonant circuit.

16. A method of detecting a change in the Q of a band-pass resonant circuit comprising the steps:

scanning the resonant circuit with frequency-modulated cyclic signals to periodically traverse the band-pass of said resonant circuit;

determining when the amplitude of the frequency-modulated signals translated by the resonant circuit exceeds a preset level greater than zero;

generating a test signal having a time duration corresponding to the time period the signal translated by said resonant circuit exceeds said preset level;

measuring the time duration of said test signal for each traversal, and detecting a change in the time duration of said test signal.

17. Control apparatus comprising:

inductive means;

capacitive means;

circuit means connecting said inductive means and said capacitive means in a resonant circuit exhibiting a band-pass characteristic the amplitude of which varies as a function of objects positioned in the vicinity of at least one of said capacitive means and said inductive means;

means for applying a periodically reoccurring frequency-modulated signal to said resonant circuit;

threshold circuit means coupled to receive signals passed by said resonant circuit to determine when the amplitude of the signal passed by the resonant circuit exceeds a preset level and for generating a control signal having a time duration corresponding to the time period the signal translated by said resonant circuit exceeds said preset level, and circuit means coupled to receive said control signal for measuring the time duration thereof and providing an indication when an object in the vicinity of at least one of said capacitive means and said inductive means changes the amplitude of said band-pass characteristic. 160 41 On On the 70 the amplitudes 81 20,

* * * * *